J. E. BELL.
METHOD OF UTILIZING WASTE HEAT GASES OF CEMENT KILNS.
APPLICATION FILED SEPT. 26, 1919.
1,421,386.
Patented July 4, 1922.
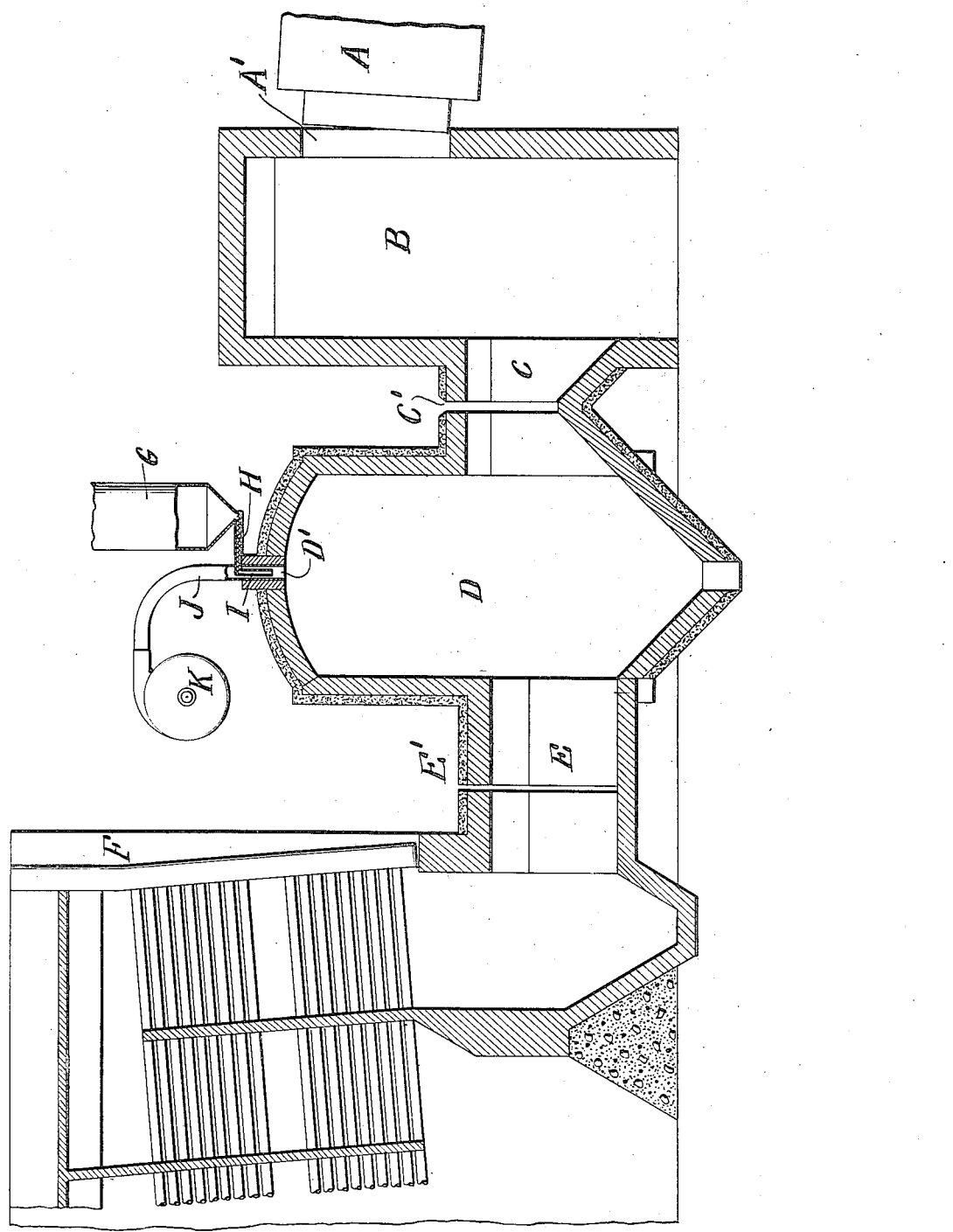

UNITED STATES PATENT OFFICE.

JOHN E. BELL, OF BROOKLYN, NEW YORK.

METHOD OF UTILIZING WASTE-HEAT GASES OF CEMENT KILNS.

1,421,386.          Specification of Letters Patent.          Patented July 4, 1922.

Application filed September 26, 1919. Serial No. 326,650.

*To all whom it may concern:*

Be it known that I, JOHN E. BELL, a citizen of the United States of America, and resident of Brooklyn, in the county of Kings and State of New York, have invented a certain new and useful Improvement in Methods of Utilizing Waste-Heat Gases of Cement Kilns, of which the following is a true and exact description, reference being had to the accompanying drawings, which form a part thereof.

My invention relates to the utilization of waste heat gases from cement kilns. It is well known that the gases escaping from cement kilns are at a high temperature and in large volume, and in many plants the waste heat of these gases has been utilized for heating boilers and other purposes. As these plants are comercially operated the waste heat gases are mixed with and include considerable percentages of uncombined oxygen, owing not only to an excess of air used in the combustion of fuel in the kilns but also to leakage of air into the waste heat flues. The object of my invention is to utilize the uncombined oxygen for the combustion of a further amount of fuel, and, in a highly efficient manner, to increase the temperature and heating value of the gases without materially increasing their weight. My invention consists, broadly speaking, in feeding into the waste heat flue leading from the kiln or kilns to the boiler or other place of use, finely divided fuel in quantity adapted to be consumed by the free oxygen in the gases contained in the flue.

In the drawing, which represents somewhat diagramatically a cement kiln plant with provision for utilizing the waste heat gases, A is a kiln of the usual rotary type; several such kilns being usually grouped together and connected to a waste heat bus flue. B is a chamber connected to the flue at its upper end, A' being the opening into the chamber. C is a flue passage from chamber B to the bus flue D. C' is a slot for a closing gate. E is a flue from the bus flue D to the waste heat boiler indicated at F. E' is a slot for a gate to close flue E. At a convenient point or points in flue D I introduce pulverized fuel. As shown, an opening D' is formed in the roof of flue D, and a pipe J from an air blast fan K leads into it. G is a hopper for pulverized coal feeding into a conveyor H, which, through a pipe I, feeds the coal into the pipe J.

In operation the gases pass from the kiln A to chamber B and thence through flue C to bus flue D, from which they pass through flue E to the boiler F. In addition to any uncombined oxygen which may pass through the kiln air in considerable percentage enters through opening A' and other joints and imperfections of the flue walls, and by feeding pulverized fuel into flue D in quantity to combine with such uncombined oxygen such fuel is burned to the greatest possible heat giving efficiency and the temperature of the waste heat gases raised to a material degree, with the result that with a given boiler plant a really material increase of steam is secured and at a very low cost.

It will then be noted that if the free oxygen in the kiln gases is entirely consumed by the finely divided fuel thrown into the flue the increase of gas weights is very little, while all of the heat giving capacity of the fuel is utilized in raising the temperature of the gases. Obviously the economy in the utilization of this heat is greater than could be secured by burning the same quantity of fuel in a furnace with an air supply sufficient to secure complete combustion, as the weight of the products of combustion is reduced and so also the heat lost in the gas finally discharged to the atmosphere. A practical advantage of my invention arises from the fact that boilers heated by waste heat are seldom used to their full evaporative capacity, and, therefore, can avail themselves of any increase in the temperature of the waste heat gases and produce larger quantities of steam. Hence the use of my improved method will in many cases enable a plant to do without an additional boiler with independent fuel supply, which would otherwise be necessary to insure a sufficient supply of steam.

In the utilization of waste heat gases power is, of course, required to draw the gases through the waste heat boiler or other heat utilizing element and in modern practice it has been found advantageous to draw the gases through the boiler at very high speed which of course involves a very considerable expenditure of power and in all cases the power required to move the gases is propertionate to the weight of the gases to be moved and their rate of flow through the heat utilizing element, hence it will be obvious that my method of increasing the temperature of the gases without material increase in their weight promotes economy and efficiency of operation, not only by the increase in temperature of the gas but also because but little more power is required to move the hot gases than would be required to move the cooler gases if my invention was not used, and much less power is required than would be necessary if the increased temperature was secured by the usual way of supplying and burning additional oxygen in admixture with nitrogen, air, in quantity sufficient to combine with the fuel which involves, of course, a material increase in the weight of the gases. Obviously, and this is very important, by my method of raising the temperature of the waste heat gases there is little or no increase in the heat loss in the waste gases as they leave the boiler or other heat utilizing plant.

I prefer to introduce my fuel, which may be either pulverized coal or sprayed liquid fuel, with an air jet which is utilized to scatter or spray the fuel and to initiate combustion of the carbon, or some of it, to CO, but the fuel supply should be such as will require and utilize also the oxygen in the kiln gases for its complete combustion to $CO_2$.

Having now described my invention, what I claim as new and desire to secure by Letters Patent, is:

1. In the operation of a plant comprising a cement kiln, a waste heat flue leading therefrom and an element for the utilization of the heat of the gases connected to said flue and so operated that the waste heat gases collected in the flue contain a considerable amount of free oxygen, the method of increasing the temperature and heat efficiency of the gases in the waste heat flue and utilizing element with small increase in the weight thereof which consists in feeding finely divided fuel into the flue in quantity proportioned to the amount of free oxygen in the waste heat gases contained in the flue and so as to utilize said free oxygen to combine with the fuel and raise the temperature of the whole body of gas.

2. In the operation of a plant comprising a cement kiln, a waste heat flue leading therefrom and an element for the utilization of the heat of the gases connected to said flue and so operated that the waste heat gases collected in the flue contain a considerable amount of free oxygen, the method of increasing the temperature and heat efficiency of the gases in the waste heat flue and utilizing element with small increase in the weight thereof which consists in feeding finely divided fuel into the flue in admixture with air in quantity insufficient to secure complete combustion, said fuel being in quantity proportioned to the amount of free oxygen in the air introduced with it and contained in the waste heat gases contained in the flue and so as to utilize said free oxygen to combine with the fuel and raise the temperature of the whole body of gas.

JOHN E. BELL.